(12) United States Patent
Schrader et al.

(10) Patent No.: US 10,701,470 B2
(45) Date of Patent: *Jun. 30, 2020

(54) CIRCUMAURAL HEADSET OR HEADPHONES WITH ADJUSTABLE BIOMETRIC SENSOR

(71) Applicant: LIGHT SPEED AVIATION, INC., Lake Oswego, OR (US)

(72) Inventors: Allan Schrader, Lake Oswego, OR (US); Matthew Raymond Evonuk, Tualatin, OR (US); Brian David Frost, Lake Oswego, OR (US)

(73) Assignee: Light Speed Aviation, Inc., Lake Oswego, OR (US)

( * ) Notice: Subject to any disclaimer, the term of this patent is extended or adjusted under 35 U.S.C. 154(b) by 39 days.

This patent is subject to a terminal disclaimer.

(21) Appl. No.: 15/697,630

(22) Filed: Sep. 7, 2017

(65) Prior Publication Data

US 2019/0075382 A1    Mar. 7, 2019

(51) Int. Cl.
*H04R 1/10* (2006.01)
*H04R 5/033* (2006.01)
(Continued)

(52) U.S. Cl.
CPC ....... *H04R 1/1008* (2013.01); *G06K 9/00892* (2013.01); *G10L 15/22* (2013.01);
(Continued)

(58) Field of Classification Search
CPC .... H04R 1/1008; H04R 1/105; H04R 1/1058; H04R 1/1066; H04R 1/1091; H04R 1/2884; H04R 5/0335
(Continued)

(56) References Cited

U.S. PATENT DOCUMENTS

| 3,644,833 A | 2/1972 | McIntosh |
| 4,775,116 A | 10/1988 | Klein |

(Continued)

FOREIGN PATENT DOCUMENTS

| EP | 2999233 A1 | 3/2016 |
| WO | 2015088980 A1 | 6/2015 |

(Continued)

OTHER PUBLICATIONS

Muhammad Farooq et al.; A Novel Wearable Device for Food Intake and Physical Activity Recognition; Department of Electrical and Computer Engineering, University of Alabama; Sensors Jul. 11, 2016; pp. 1-13.

(Continued)

*Primary Examiner* — Katherine A Faley
(74) *Attorney, Agent, or Firm* — Brooks Kushman PC

(57) ABSTRACT

A headset includes a circumaural assembly having an adjustable sensor mount configured to secure a sensor forward of the tragus of a user. The mount is movable relative to the assembly to position the sensor in contact with or proximal to the user skin. The mount may extend from an interior side or flat component of the assembly into an opening of a circumaural cushion. The sensor mount may include a resilient support arm or structure extending from behind a circumaural cushion, or integrated into the cushion, to urge the sensor into contact with the user. The mount may include a spring-biased rotatable knob having an eccentrically located aperture configured to secure the sensor, and rotatable to position the sensor. Sensor signals may be processed to detect blood flow, heart rate, etc. and/or movement, such as jaw movement indicative of talking for use in automatically muting an associated microphone.

4 Claims, 8 Drawing Sheets

(51) Int. Cl.
*G06K 9/00* (2006.01)
*H04R 1/28* (2006.01)
*H04M 1/03* (2006.01)
*G10L 15/22* (2006.01)
*G10L 17/10* (2013.01)
*H04M 1/60* (2006.01)
*G10L 25/78* (2013.01)

(52) U.S. Cl.
CPC .............. *G10L 17/10* (2013.01); *H04M 1/03* (2013.01); *H04M 1/6058* (2013.01); *H04R 1/1041* (2013.01); *H04R 1/2884* (2013.01); *H04R 5/0335* (2013.01); *G06K 2009/00939* (2013.01); *G10L 25/78* (2013.01); *H04R 5/033* (2013.01)

(58) Field of Classification Search
USPC .................................. 381/370–379, 381–384
See application file for complete search history.

(56) References Cited

U.S. PATENT DOCUMENTS

| | | | |
|---|---|---|---|
| 5,372,134 | A | 12/1994 | Richardson |
| 6,498,942 | B1 | 12/2002 | Esenaliev et al. |
| 7,040,319 | B1 | 5/2006 | Kelly et al. |
| 8,699,742 | B2 * | 4/2014 | Heiman ................ H04S 7/301 381/151 |
| 9,826,941 | B1 | 11/2017 | Serovy et al. |
| 2007/0173611 | A1 | 7/2007 | Yoshimi et al. |
| 2008/0013777 | A1 * | 1/2008 | Park ...................... A61B 5/0059 381/384 |
| 2009/0010474 | A1 | 1/2009 | Ouryouji |
| 2009/0214060 | A1 | 8/2009 | Chuang et al. |
| 2010/0131269 | A1 * | 5/2010 | Park ...................... G10K 11/178 704/233 |
| 2010/0217098 | A1 | 8/2010 | LeBoeuf et al. |
| 2010/0217103 | A1 | 8/2010 | Abdul-Hafiz et al. |
| 2012/0014553 | A1 * | 1/2012 | Bonanno ................ H03G 3/341 381/364 |
| 2012/0278070 | A1 | 11/2012 | Herve et al. |
| 2013/0343585 | A1 * | 12/2013 | Bennett ................ H04R 25/554 381/315 |
| 2015/0146893 | A1 | 5/2015 | Kunimoto |
| 2015/0156598 | A1 | 6/2015 | Sun et al. |
| 2015/0189441 | A1 | 7/2015 | Oishi et al. |
| 2016/0029974 | A1 | 2/2016 | Armstrong et al. |
| 2017/0099539 | A1 | 4/2017 | DiCenso et al. |
| 2018/0303392 | A1 | 10/2018 | Everman et al. |
| 2018/0310893 | A1 | 11/2018 | Everman et al. |
| 2019/0167211 | A1 | 6/2019 | Everman et al. |

FOREIGN PATENT DOCUMENTS

| | | |
|---|---|---|
| WO | 2016022295 A1 | 2/2016 |
| WO | 2016140835 A1 | 9/2016 |

OTHER PUBLICATIONS

Oliver Amft; A Wearable Earpad Sensor for Chewing Monitoring; ACTLab, Signal Processing Systems, TU Eindhoven, The Netherlands, IEEE Sensors 2010; pp. 222-227.

Bedri et al.; Stick It in Your Ear: Building an In-Ear Jaw Movement Ubicomp/ISWC' 15 Adjunct; Sep. 7-11, 2015, Osaka, Japan; pp. 1333-1338.

International Search Report and Written Opinion for International Application No. PCT/US18/50019 dated Oct. 16, 2018.

Ming-Zhee Poh et al.; Cardiovascular Monitoring Using Earphones and a Mobile Device; IEEE CS; MIT Media Lab; Sep. 22, 2012; pp. 18-26.

* cited by examiner

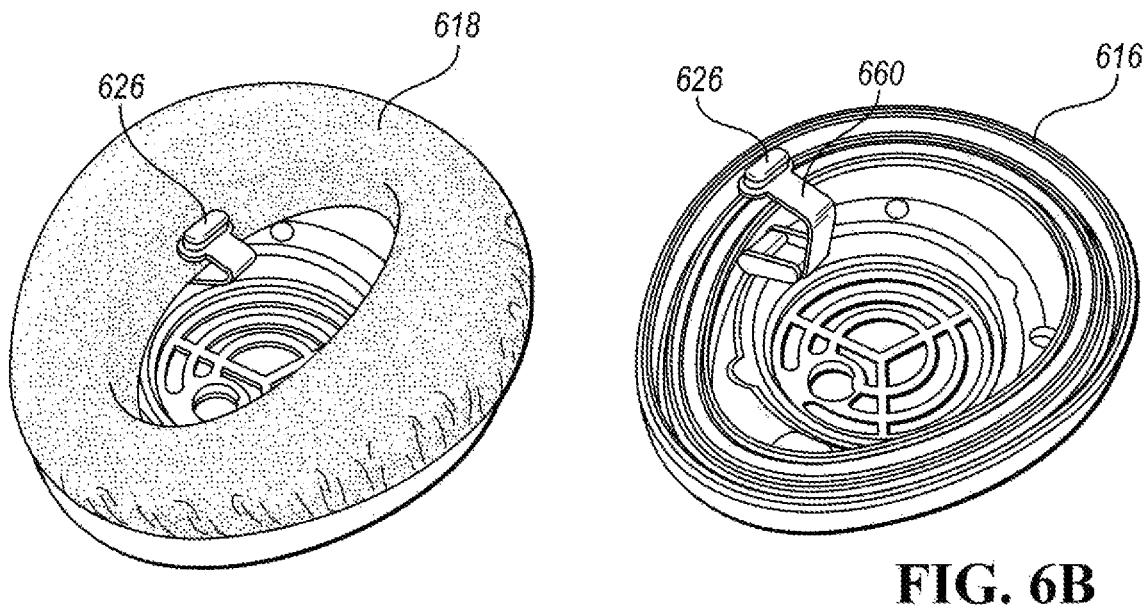
FIG. 6A
FIG. 6B
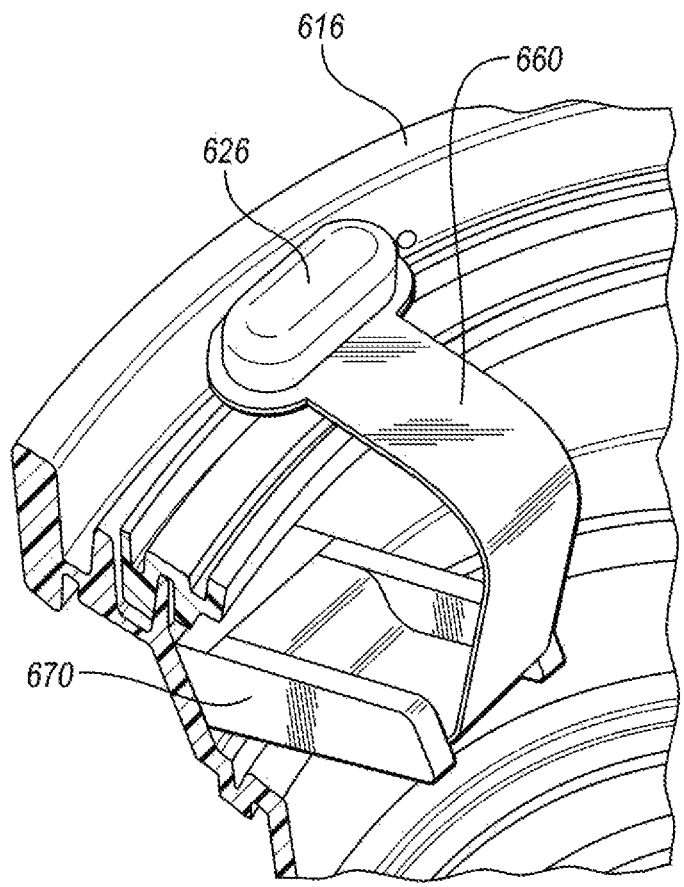
FIG. 6C

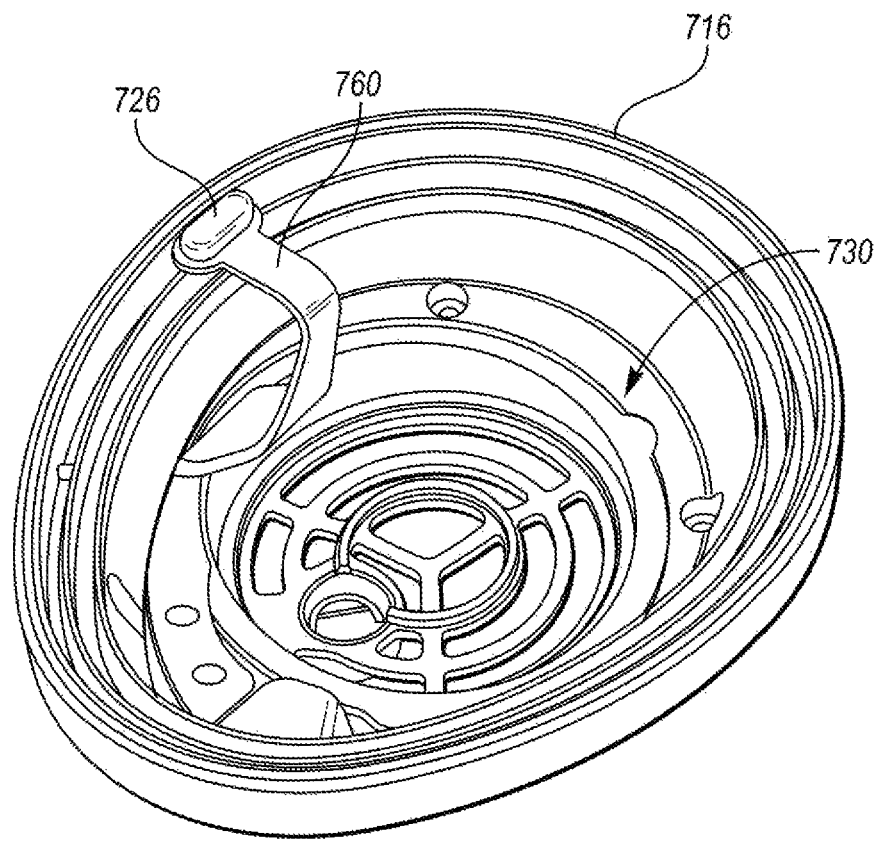
FIG. 7A
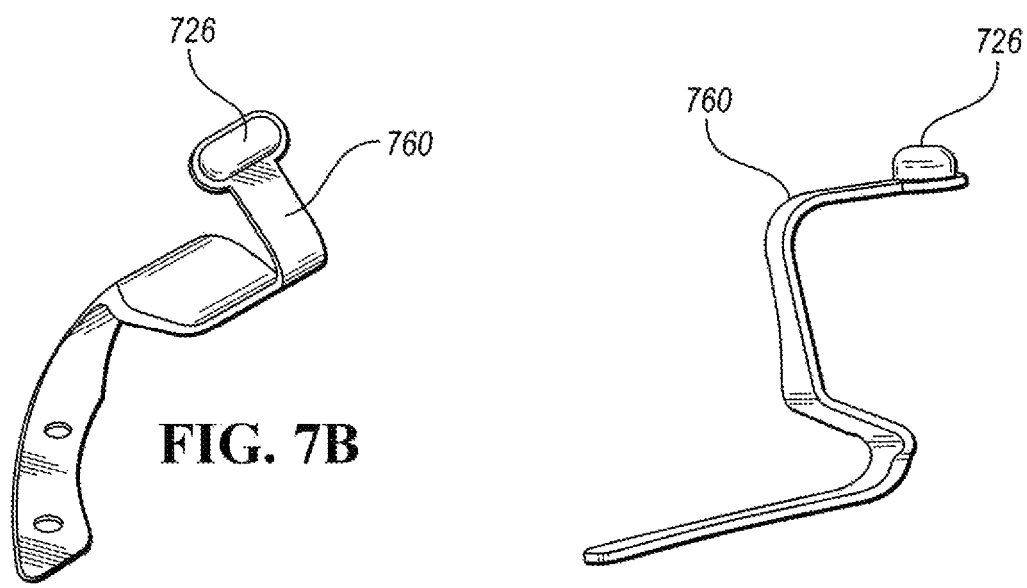
FIG. 7B
FIG. 7C

CIRCUMAURAL HEADSET OR HEADPHONES WITH ADJUSTABLE BIOMETRIC SENSOR

TECHNICAL FIELD

This disclosure relates to circumaural headphones or earmuffs having an adjustable sensor mount for a biometric or physiological sensor.

BACKGROUND

Various types of sensors are being used to monitor personal physiological or biometric parameters related to health and/or performance during specified events or time periods, as well as during everyday activities. Monitoring of parameters such as heart rate, blood pressure, respiration rate, oxygen saturation, blood chemistry, blood flow, etc. under various environmental and use conditions presents numerous challenges in providing an acceptable sensor signal for processing. For example, motion artifacts generated by movement of the user and/or sensor during use may decrease accuracy of the resulting signal analysis results if not properly accommodated. Similarly, variation in positioning of the sensor relative to an expected placement, or movement during use may result in decreased accuracy. Changes in ambient conditions, such as variations in ambient light, sound, vibration, etc. may also contribute to noise in the sensor signal.

Biometric sensors have been integrated with earphones and headphones as the ear has been identified as being particularly amenable to photoplythysmography (PPG), or the optical volumetric measurement of blood flow, and similar optical measurements. Pulse oximetry sensors have been integrated into the cushion of circumaural headsets to measure blood oxygen saturation. Earphones, ear buds, headphones, and similar devices provide a convenient form factor that users are generally familiar with and comfortable with positioning of the devices.

SUMMARY

In one embodiment, a circumaural headset includes a band connecting first and second circumaural assemblies. At least one circumaural assembly includes a sensor mount configured to secure a sensor thereto, the sensor mount movable relative to the assembly to position the sensor in contact with a user forward of a tragus of the user when the headset is worn. In various embodiments, the sensor mount extends from within an earcup of the assembly to position the sensor in contact or near contact with the user. The sensor mount may include a generally U-shaped portion that extends around a circumaural foam cushion secured directly or indirectly to the earcup. The foam cushion may provide a resilient force to hold the sensor in contact with the user. In one embodiment, the sensor mount is integrated within a circumaural foam cushion of the assembly and configured so that the sensor is generally flush with the surface of the cushion. The sensor mount may include a resilient component, such as a spring, to urge the sensor into contact with the user.

Embodiments of a circumaural headset according to the disclosure may include a band connecting two circumaural assemblies with each assembly including an earcup having an adjustable biometric sensor mount configured to move a sensor relative to the assembly. The mount may include a threaded or grooved knob rotatable about a complementary threaded or grooved base to extend or retract the sensor relative to the assembly in response to rotating the knob. In one embodiment, the mount includes a spring-biased knob with an eccentrically mounted sensor. The knob engages a groove, slot, or similar feature in a base to allow the knob to rotate and translate relative to the base. Rotation may be limited by a similar feature to prevent excessive twisting of sensor wires for wired sensor applications. The base may extend from an arm, which may be made of a resilient material, mounted to a side portion or back portion of a circumaural earcup, or to a side portion or back portion of an interior component of the earcup, such as a speaker plate.

Embodiments may include a headset having a circumaural earcup with a biometric sensor mount extending from an interior of the earcup slightly beyond a surface plane of an associated circumaural cushion secured to the earcup. The sensor mount may extend from an interior side surface, or an interior back surface of a component within the earcup to position a biometric sensor forward (toward the face) of the tragus of the user, over at least a portion of the temporomandibular joint (TMJ) of the user in contact or near contact with the skin of the user. The mount may be made of a resilient material to facilitate movement toward or away from the head of the user while maintaining contact with or close proximity to the user during movement of the user or headset. The mount may extend around the cushion such that the biometric sensor is positioned between the cushion and the user when the headset is worn. In one embodiment, the cushion may include a recess or cutout to accommodate at least a portion of the mount so that the sensor is approximately flush with the cushion. In another embodiment, the mount is configured to position the sensor rearward (toward the back of the head of the user) of the forward portion of the cushion.

Various embodiments of a headset or muff having an adjustable sensor mount may include earcups with additional components for active noise reduction (ANR), passive hearing protection, audio, and/or voice communications using wired or wireless technology. ANR applications may include at least one earcup having a driver, error (sense) microphone, an optional voice/speech microphone and/or an optional ambient noise microphone coupled to one or more controllers to provide ANR and voice/speech functions.

One or more embodiments of a headset may include an associated controller having a microprocessor in communication with a biometric sensor mounted to at least one circumaural assembly. The biometric sensor may be mounted on an adjustable mount configured to move the sensor to a desired position on the user and maintain contact between the sensor and the user while delivering a comfortable fit wearing the headset. The controller may be programmed to analyze signals from the sensor. In one embodiment, the controller is programmed to detect jaw position and/or movement of the user in response to signals from the sensor. User jaw position and/or movement may be used to infer that a user is talking. The controller may provide a gating signal to a voice/speech microphone in response to detecting that the user is talking such that the voice/speech microphone signal is automatically muted when the user is not talking. User jaw position and/or movement as detected by the sensor may also be used to identify other user behavior, such as chewing or yawning, to distinguish from talking, or to provide a local or remote alert, for example.

Embodiments according to this disclosure may provide one or more advantages. For example, adjustable mounting of a sensor within a circumaural headset may allow the user to adjust the position of the sensor relative to the headset to improve signal to noise ratio and resulting accuracy and reliability of the sensor signal. The circumaural headset may provide isolation for the sensor to reduce the effect of environmental factors, such as ambient noise and light, on the sensor signals. Resilient mounting of a sensor may improve skin proximity or contact with the sensor during physical activity, while also improving comfort. Positioning of a biometric sensor in contact with the skin in front of the tragus over at least a portion of the TMJ provides a viable location for measurement of various biometric parameters, such as heartrate, oxygen saturation, blood flow, etc. Positioning of the sensor forward of the tragus within a designated target area using a circumaural headset/headphone provides limited location variability from person to person. An adjustable sensor mount according to various embodiments facilitates user adjustment and positioning of the sensor in two dimension for proper placement, with a third-dimension adjustment for comfort and proper skin contact or proximity. Detection of jaw movement using a sensor may be used to provide an automatic muting or gating function for a communication microphone associated with the headset, or to provide local or remote alerts based on inferred behavior associated with jaw position or movements.

The above advantages and other advantages and features will be readily apparent from the following detailed description of the preferred embodiments when taken in connection with the accompanying drawings.

BRIEF DESCRIPTION OF THE DRAWINGS

FIGS. 6A-6C illustrate an earcup assembly and a side-mounted adjustable support arm for a sensor according to one or more embodiments;

FIGS. 7A-7C illustrate an earcup assembly and a flat-mounted adjustable support arm for a sensor according to one or more embodiments;

DETAILED DESCRIPTION

As required, detailed embodiments are disclosed herein; however, it is to be understood that the disclosed embodiments are merely representative and the claimed subject matter may be embodied in various and alternative forms not explicitly illustrated or described. The figures are not necessarily to scale; some features may be exaggerated or minimized to show details of particular components. Therefore, specific structural and functional details disclosed are not to be interpreted as limiting, but merely as a representative basis for teaching one skilled in the art to variously employ the claimed subject matter.

Figure 1:
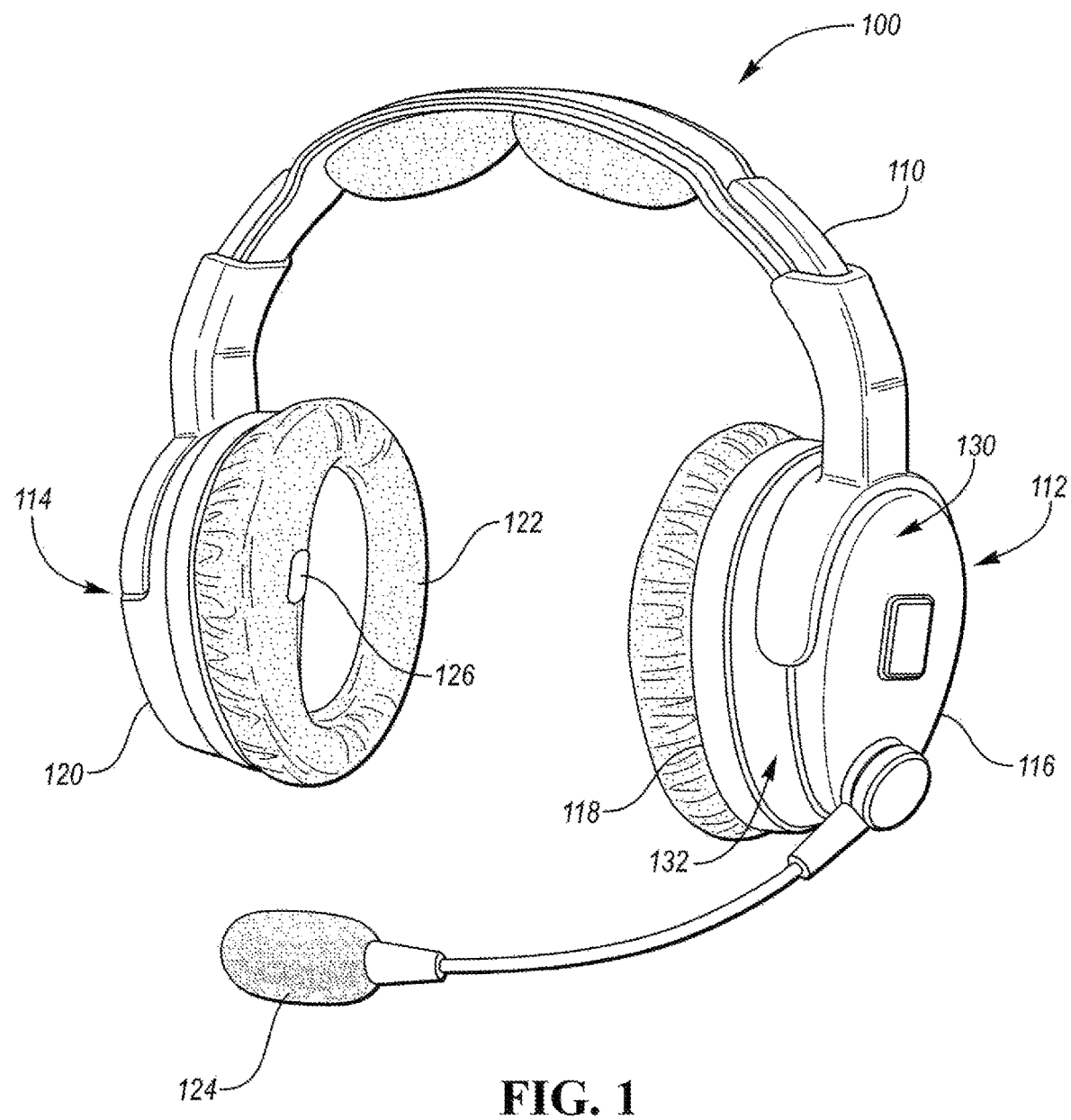
FIG. 1 illustrates a representative circumaural headset having an adjustable sensor mount according to one or more embodiments.

FIG. 1 illustrates a representative circumaural headset having an adjustable biometric sensor mount according to one or more embodiments. Headset 100 includes a band 110 connecting first circumaural earcup assembly 112 and second circumaural earcup assembly 114. Each earcup assembly 112, 114 includes an associated earcup 116, 120 and cushion 118, 122. Each earcup 116, 120 includes a bottom portion 130 and a circumaural side portion 132. Headset 100 may include a microphone 124, which is implemented by a wired boom microphone in the representative embodiment illustrated. In other embodiments, headset 100 may communicate with an associated wireless microphone or with a wireless device having a microphone. When included, a microphone may be implemented with or without a boom, on a short boom, integrated into a wired connection, implemented by an optical comparator system, etc. Some embodiments do not include an associated microphone.

Headset 100 includes at least one sensor 126 secured to an adjustable sensor mount, which is secured to at least one of the first 112 and second 114 circumaural earcup assemblies. Various representative embodiments are described with reference to a biometric or physiological sensor. However, those of ordinary skill in the art will recognize that sensor 126 may be implemented by various types of sensors that may employ chemical, electrical, and/or optical technology to provide detection or measurement of various environmental conditions as well as user characteristics and/or movements. As such, the representative embodiments described and illustrated are not limited to biometric or physiologic sensors. Other examples of sensors may include acoustic sensors, accelerometers, and gyroscopes, for example.

As described in greater detail below, the adjustable sensor mount is configured to be movable in at least one direction or dimension to adjust a position of the sensor 126 relative to the earcup assembly 114 to position the sensor within a target region 210 (FIG. 2) of the user, either in contact with the user or near contact, such as within 0-5 mm of the user, for example. In various embodiments, the target area or region 210 is generally forward of a tragus of the user as generally indicated in the ear anatomy of FIG. 2, and may extend above or below the tragus. In one or more embodiments, target region 210 extends between 5 mm-50 mm in front of the tip of the tragus, and within 25 mm above the helix to 25 mm below the ear lobe (or lobule of the ear).

For embodiments employing a biometric or physiologic sensor, sensor 126 may be implemented by any of a number of commercially available sensors that may be used to provide signals indicative of physiological parameters or characteristics of the user/wearer such as heart rate, blood pressure, respiration rate, oxygen saturation, blood chemistry, blood flow, etc. In one embodiment, signals from a biometric sensor 126 are used to detect jaw position and/or movement of the user that may indicate talking, chewing, yawning, etc. Jaw position signals may be used to provide a gating signal to provide an automatic muting function for microphone 124 that mutes microphone 124 except when the user is talking.

Figure 2:
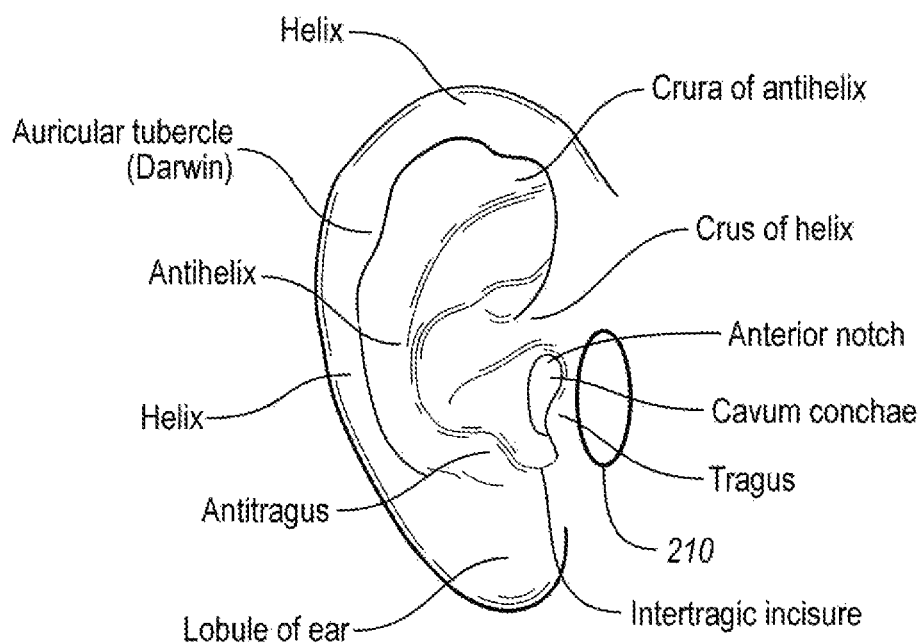
FIG. 2 illustrates ear anatomy with a target area forward of the tragus over at least a portion of the temporomandibular joint (TMJ) for positioning of a sensor of a circumaural headset according to one or more embodiments.

FIG. 2 illustrates ear anatomy with a target area 210 forward of the tragus over at least a portion of the temporomandibular joint (TMJ) for positioning of a biometric sensor 126 of a circumaural headset according to one or more embodiments. As used throughout this description, an adjustable sensor mount provides movement of the sensor relative to the earcup assembly in at least one direction. In some embodiments, movement may be provided in non-orthogonal directions, or along one or more of an x-axis, y-axis, and z-axis direction where the x-axis is defined by moving forward in the direction of the face or rearward in the direction of the back of the head (horizontally), the y-axis is defined by moving in the direction of the top of the head (upward) or the neck (vertically, downward), and the z-axis is defined by moving toward the head or away from the head.

Figure 3:
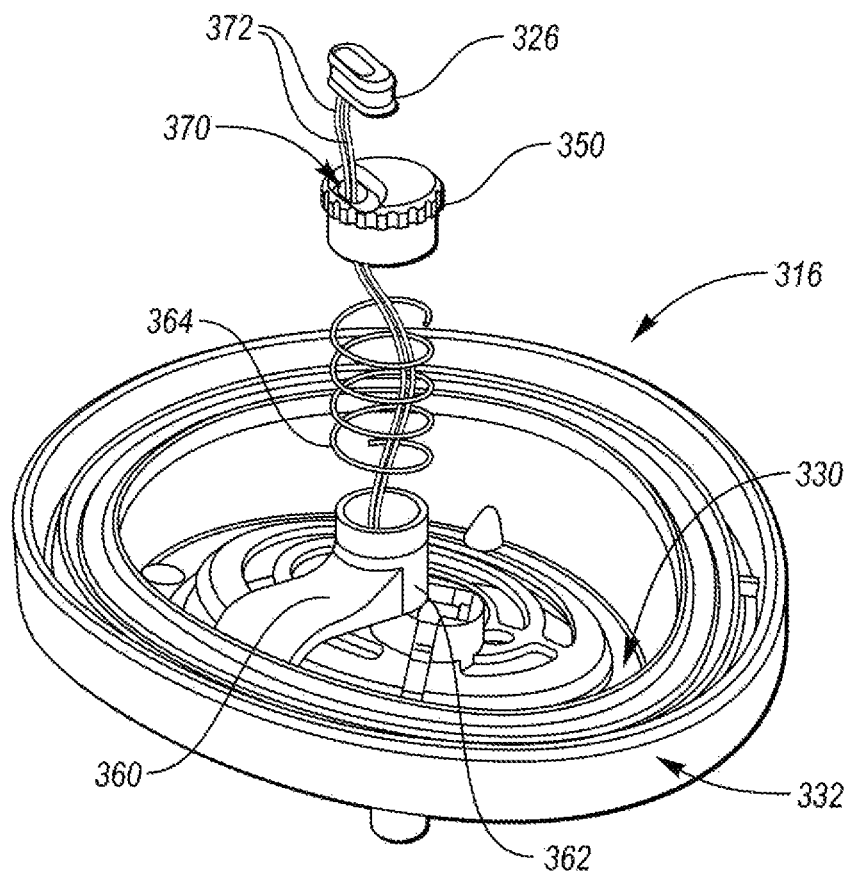
FIG. 3 is an assembly view of a representative earcup having a sensor eccentrically mounted on a spring-biased adjustment knob supported from an interior side surface of an earcup assembly according to one or more embodiments.

FIG. 3 is an assembly view of a representative earcup 316 having a biometric sensor 326 eccentrically mounted on a spring-biased adjustment knob or cap 350 supported from an interior side surface 332 of the earcup 316 according to one or more embodiments. As used throughout this description, references to a spring, spring-biased, or resilient component or device are meant to be broadly construed and refers generally to an elastic component or device that recovers its original shape when released after being distorted. A sensor mount supported from a side surface of the earcup assembly may provide various advantages including improved repeatability and reliability of sensor placement and position/contact relative to the user, as well as providing user comfort along the z-axis. Sensor (or support) arm 360 extends from an interior side surface 332 and supports base 362. Interior side surface 332 may be an interior side surface of the earcup 316 or another component within the earcup assembly generally orthogonal to the head of the user. Alternatively, support arm 360 may extend from a flat surface 330 of the earcup 316 or the earcup assembly that is generally parallel to the head of the user. For example, support arm 360 may extend from a speaker plate secured to the earcup as illustrated in FIG. 7.

Support arm 360 and base 362 may be integrally formed or molded with earcup 316 in some embodiments. Support arm 360 may be flexible or resilient to urge biometric sensor 326 into contact with the headset user. In one embodiment, support arm 360 may be repositionable around the circumference of the earcup, or at least a portion of the circumference of the earcup. Alternatively, or in combination, a spring 364 may be disposed within or around base 362 with cap 350 rotatably secured to base 362 over spring 364 and moveable against a spring force of spring 364 toward base 362. Cap 350 includes an eccentrically located aperture 370 configured to receive and secure biometric sensor 326. In the representative embodiment illustrated, biometric sensor 326 is implemented by a wired sensor with wires 372 communicating with a controller (FIG. 8). Biometric sensor 326 may also be implemented by a wireless sensor depending on the particular application. For applications having a wired biometric sensor 326, cap 350 and base 362 may include complementary grooves with stops to limit rotation of cap 350 to less than 360 degrees to reduce twisting of wires 372.

In some embodiments, cap 350 and base 362 may include complementary threads or grooves to move or adjust sensor 326 along the z-axis with resistance provided by spring 364 to maintain a particular rotational position. In these embodiments, biometric sensor 326 may be centrally located within cap 350. In other embodiments, a slot or groove in base 362 may cooperate with a corresponding or complementary protrusion within cap 350 to secure cap 350 to base 362 and limit movement along the z-axis. Spring 364 resiliently biases cap 350 to extend from base 362 along the z-axis into contact with the headset user. In these embodiments, rotation of the cap 350 and eccentrically mounted sensor 326 may be used to better locate or position the sensor in the x-axis and y-axis directions with respect to the target area or region forward of the tragus of the user generally over a portion of the TMJ.

Figure 4A:
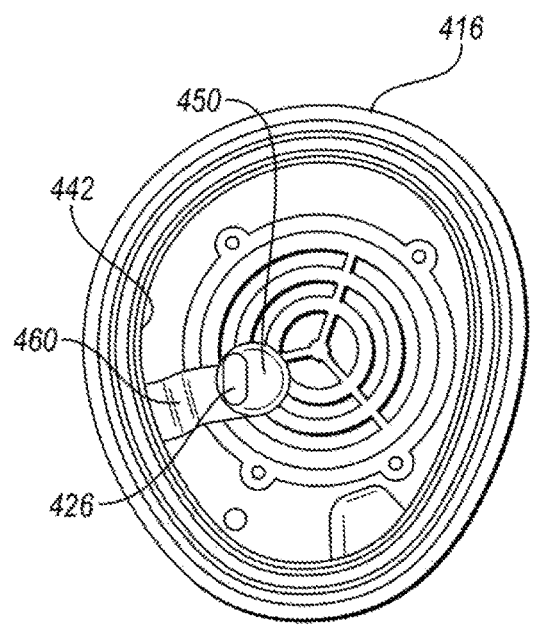
FIGS. 4A and 4B illustrate an earcup assembly having a side-mounted support arm and base for an adjustable sensor without the cushion, and with the cushion installed, respectively, according to one or more embodiments.
Figure 4B:
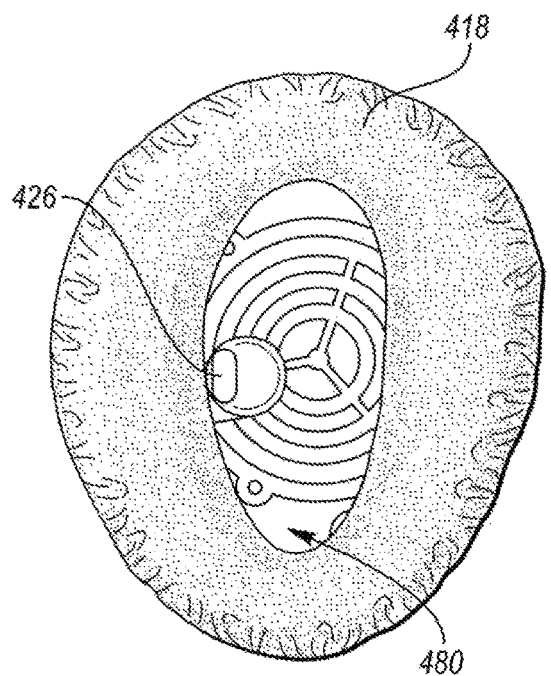

FIGS. 4A and 4B illustrate an earcup 416 having a side-mounted support arm 460 and base for an adjustable biometric sensor 426 without the cushion 418, and with the cushion 418 installed, respectively, according to one or more embodiments. As previously described, sensor 426 may be eccentrically mounted on a rotatable cap 450 secured to a base (not shown) supported by support arm 460, which extends from an interior side surface 442 of earcup 416. As shown in FIG. 4B, support arm 460 positions sensor 426 within the opening 480 of cushion 418. In other embodiments, sensor 426 may at least partially overlap a side portion of cushion 418. Support arm 460 may be mounted to slide along an interior guide or rail within earcup 416 in some embodiments.

Figure 5A:
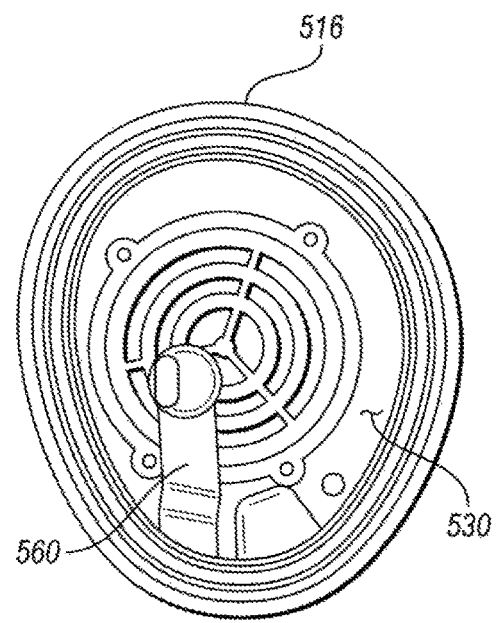
FIGS. 5A and 5B illustrate an earcup assembly having a flat-mounted support arm extending from a flat surface of the earcup assembly for an adjustable sensor without the cushion, and with the cushion installed, respectively, according to one or more embodiments.
Figure 5B:
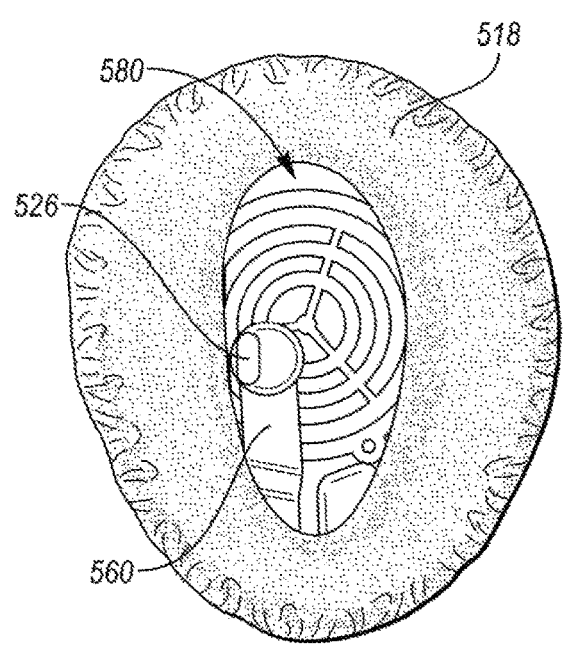

FIGS. 5A and 5B illustrate an earcup 516 having a flat-mounted support arm 560 extending from a flat surface 530 of the earcup assembly for an adjustable biometric sensor without the cushion 518, and with the cushion 518 installed, respectively, according to one or more embodiments. As previously described, flat surface 530 may be a flat surface of the earcup or a component mounted within the earcup, such as a speaker plate or similar component, for example. In some embodiments, support arm 560 is moveable around at least a portion of the interior of earcup 516. Support arm 560 is configured to position biometric sensor 526 within opening 580 of circumaural cushion 518.

FIGS. 6A-6C illustrate an earcup 616 and a side-mounted adjustable support arm 660 for a biometric sensor 626 according to one or more embodiments. FIG. 6A illustrates positioning of biometric sensor 626 within an opening in cushion 618. As shown in FIGS. 6B and 6C, biometric sensor 626 is mounted on a spring arm 660, which is secured by a lateral support 670. In some embodiments, lateral support 670 may be movable around the interior of earcup 616 to position biometric sensor 626 in the x-axis and y-axis directions. Movement of biometric sensor 626 in the z-axis direction is provided by spring arm 660.

FIGS. 7A-7C illustrate an earcup 716 and a flat-mounted adjustable support arm 760 for a biometric sensor 726 according to one or more embodiments. Support arm 760 is mounted on a flat surface 730 of earcup 716 or another component mounted within the earcup assembly. Flat surface 730 may be a bottom surface of earcup 716, or a speaker plate, for example. Flat surface 730 may be generally parallel to the user's head, or alternatively at an angle, such as less than 45 degrees relative to parallel. Support arm 760 may be made of a resilient material to provide a spring force that urges biometric sensor 726 into contact with the user when the headset is worn. As described with respect to other embodiments, and generally applicable to all embodiments, any adjustments that facilitate positioning of the sensor within the target region in contact with the user may also provide positioning within the target region in near contact with the user, such as within 0-5 mm, for example. Similar to the side-mounted embodiments illustrated in FIGS. 6A-6C, some embodiments of a flat-mounted adjustable support arm have the support arm 760 movable around at least a portion of flat surface 730 to provide adjustments in the x-axis and y-axis directions. Movement of biometric sensor 726 in the z-axis direction may be provided by the resilient support arm 760.

Figure 8A:
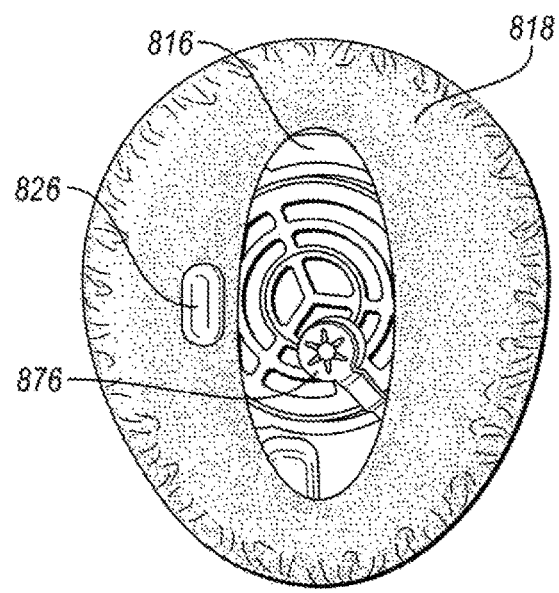
FIGS. 8A-8D illustrate an earcup assembly and cushion having an adjustable sensor integrated with the cushion according to one or more embodiments.
Figure 8B:
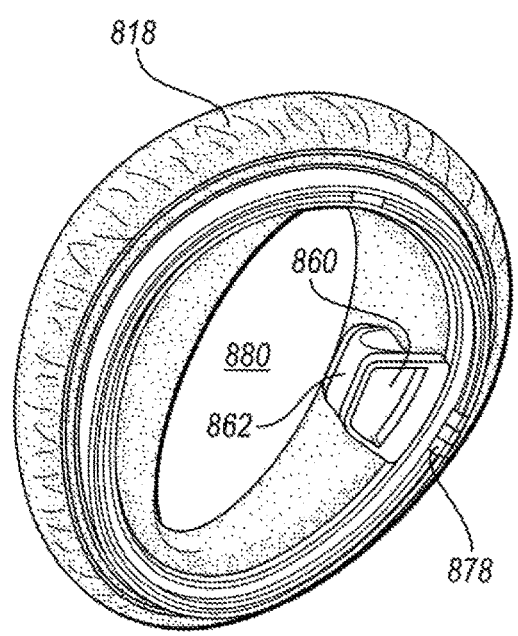
Figure 8C:
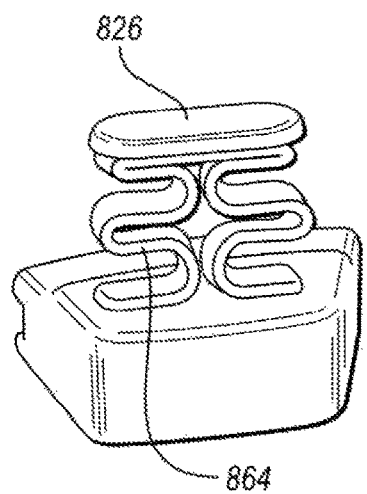
Figure 8D:
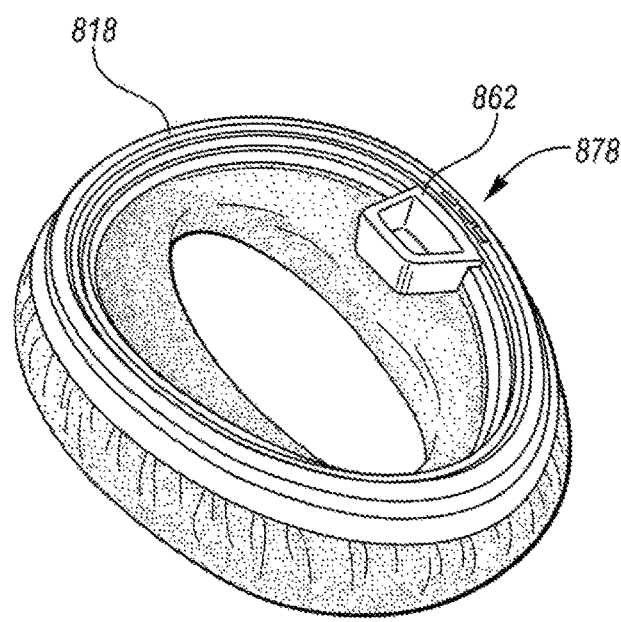
Figure 10:
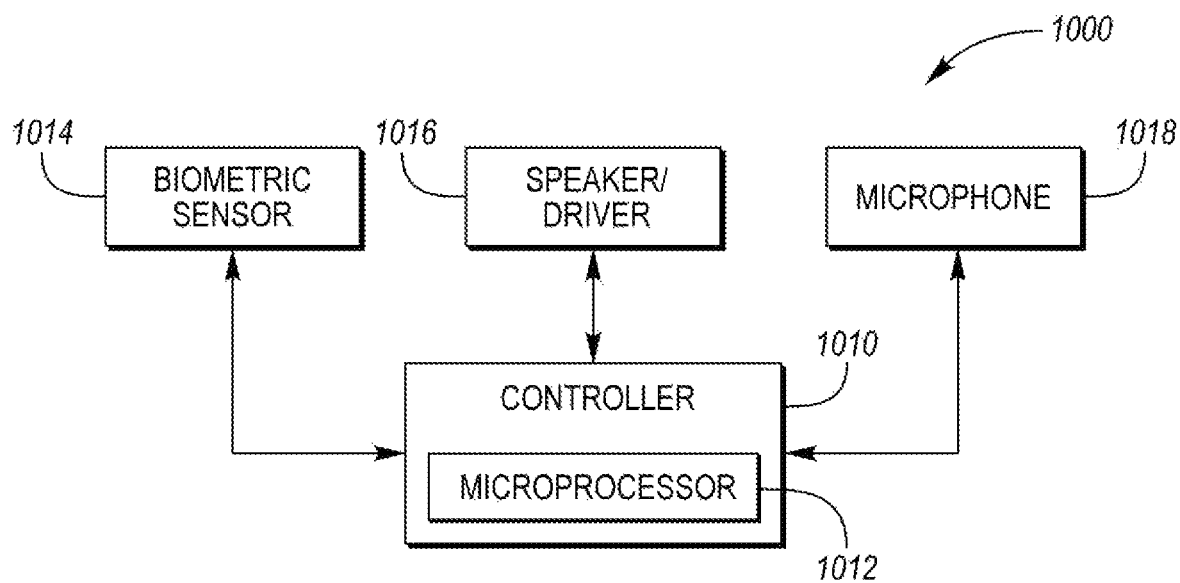
FIG. 10 is a block diagram illustrating operation of a representative control system for a circumaural headset having an adjustable sensor according to one or more embodiments.

FIGS. 8A-8D illustrate an earcup 816 and cushion 818 having an adjustable biometric sensor 826 integrated with the cushion 818 according to one or more embodiments. FIG. 8A also illustrates representative placement of a speaker/driver 876. As shown in the underside view of FIG. 8B, a support arm 860 extends from a side of the cushion seal and supports a base 862. In this embodiment, base 826 extends through cushion 818 rather than being positioned within circumaural opening 880. Electrical contacts 878 may be provided to connect biometric sensor 826 to a controller (FIG. 10). As shown in FIG. 8C, the adjustable sensor mount may include an integrally molded spring 864 implemented by first and second serpentine springs in this example. Spring 864 may be implemented as a coil spring or in any other manner depending on the particular application. Biometric sensor 826 extends through cushion 818 and may be generally flush with the cushion surface or extend slightly beyond the cushion surface when the cushion is not compressed.

Figure 9:
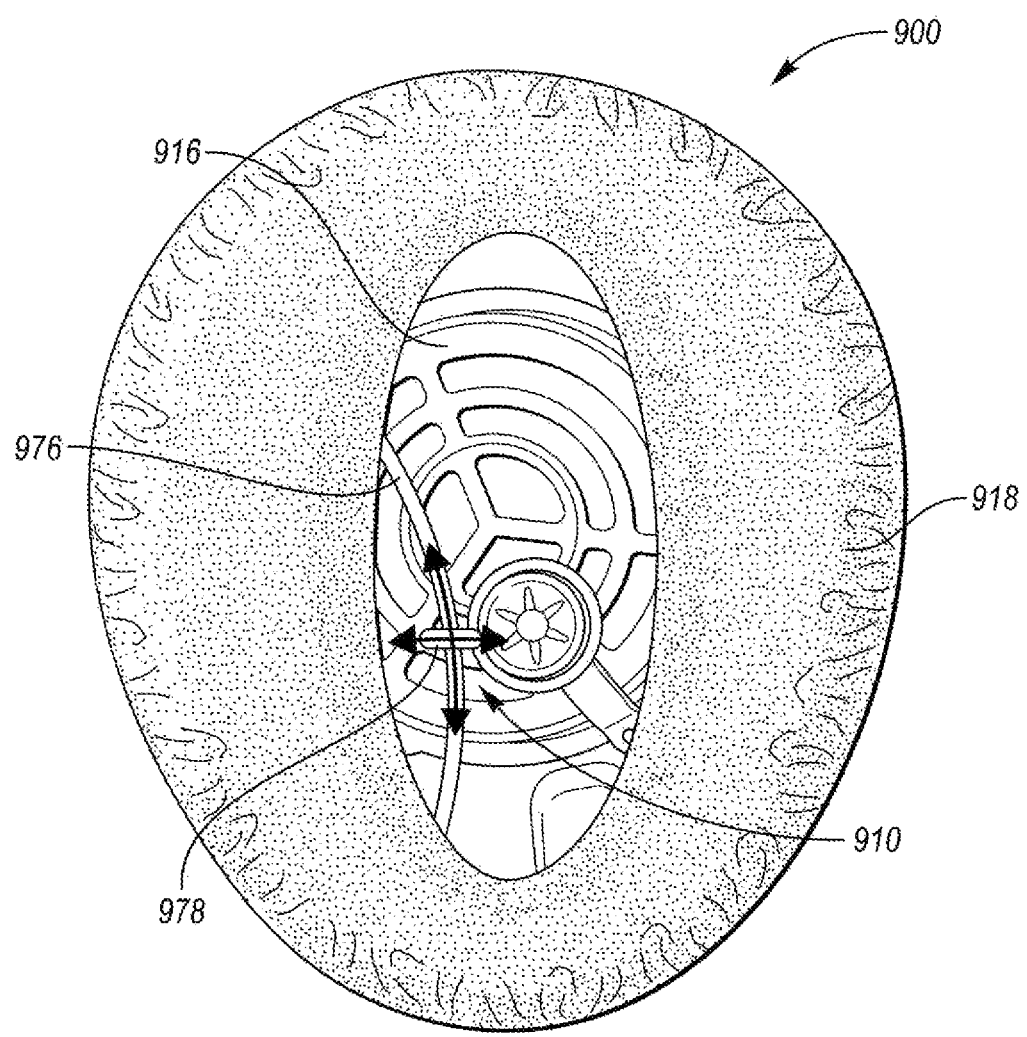
FIG. 9 illustrates an earcup assembly having a rack-on-rack adjustment support for a sensor according to one or more embodiments.

FIG. 9 illustrates an earcup assembly 900 having a rack-on-rack adjustment support 910 for a biometric sensor according to one or more embodiments. Rack-on-rack adjustment support 910 includes an arcuate rack 976 mounted within earcup 916 generally behind or below a front surface of cushion 918. A transverse rack 978 engages arcuate rack 976 and is slidable relative thereto. Arcuate rack 976 may include teeth or similar detents that allow transverse rack 978 to move or slide along arcuate rack with sufficient force, while holding transverse rack 978 in a selected position when sufficient force is not applied. Transverse rack 978 may also include teeth on a top surface to engage the base of the sensor mount (best illustrated in FIGS. 3-5) allowing the base to slide along transverse rack 978 in a similar fashion.

FIG. 10 is a block diagram illustrating operation of a representative control system for a circumaural headset having an adjustable biometric sensor according to one or more embodiments. System 1000 includes a controller 1010, which may include a processor 1012. As those of ordinary skill in the art will recognize, a controller 1010 may refer to software and/or hardware that cooperate to provide control of the system. Controller 1010 and/or processor 1012 may be implemented by general purpose or special purpose processors, chips, or microcontrollers, that may include one or more programmable circuits, elements, microprocessors, etc., such as digital signal processors (DSPs), FPGAs, and ASICs, for example. Controller 1010 communicates with biometric sensor 1014, speaker/driver 1016, and microphone 1018 via wired and/or wireless communication. Controller 1010 may be programmed to perform various functions, features, or algorithms as generally described herein and as represented by flow charts or similar diagrams such as shown in FIG. 11.

Figure 11:
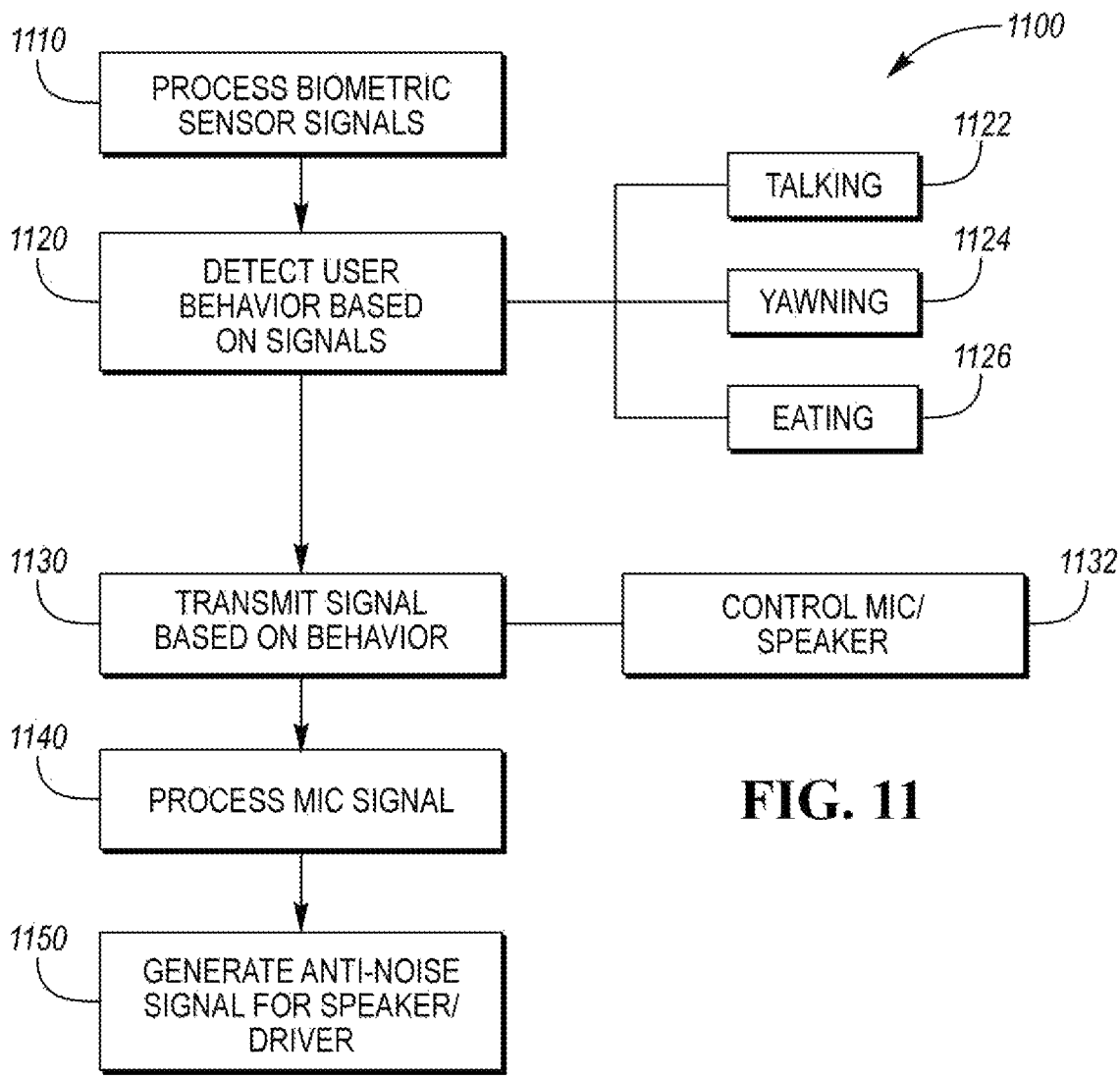
FIG. 11 is a flowchart illustrating operation of a system or method for controlling a circumaural headset having an adjustable sensor according to one or more embodiments.

FIG. 11 is a flowchart 1100 illustrating operation of a system or method for controlling a circumaural headset having an adjustable biometric sensor according to one or more embodiments. The flowchart provides representative control strategies and/or logic that may be implemented using one or more processing strategies such as event-driven, interrupt-driven, multi-tasking, multi-threading, and the like. Various control strategies including, but not limited to, open-loop, closed-loop, adaptive, feedback, feedforward, and hybrid strategies may be implemented by control logic, functions, or software executed by controller 1010 to provide active noise reduction, processing of sensor signals to monitor conditions and/or movements of the user, environmental or ambient conditions, and/or processing or analysis of sensor signals to provide an alert or control signal to a local or remote device, such as a microphone or speaker, in various embodiments. Alternatively, sensor data may be transmitted for storage and/or processing at a remote computer, server, or cloud device, for example.

Various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based controller represented by controller 1010 and microprocessor 1012. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a processor to perform the described function or feature. The computer-readable storage devices or media may include one or more of a number of known physical devices which utilize electric, magnetic, and/or optical storage to keep executable instructions and associated information, operating variables, and the like.

Block 1110 represents processing of signals received from a biometric sensor. Signals may be received by a wire connecting the sensor to the processor, or via wireless communication. Signal processing may be performed to monitor one or more physiological parameters of the headset user, which may be stored in a computer readable storage associated with the controller. Sensor signals from the biometric sensor may also be processed and analyzed to detect user jaw position and/or movement and infer an associated user behavior based on the signals as represented at block 1120. For example, jaw position or movement may be analyzed to infer that a user is talking as represented at block 1122, yawning as represented at block 1124, or eating as represented at block 1126.

A signal may be generated in response to detected user behavior and transmitted locally or remotely as represented at block 1130. The signal may be used to control an associated microphone or speaker as represented at block 1132. In one embodiment, biometric sensor signals are processed to detect user jaw position and/or motion indicative of talking with the resulting signal used to provide a gating signal or automatic muting feature for an associated microphone. This is particularly advantageous in noisy environments where automatic muting based on ambient noise levels may lead to spurious unmuting of the microphone. In some embodiments, the signal may be used as a gating signal internally within the controller or processor.

In some embodiments, one or more microphones may be used to monitor ambient noise to provide active noise reduction (ANR). In these embodiments, a microphone signal is processed as represented at block 1140 to generate an anti-noise signal out of phase with the noise, and apply the anti-noise signal to an associated speaker/driver as represented at block 1150.

As apparent from the representative embodiments illustrated, the x-axis and y-axis adjustments can be made by a user adjusting the location of the sensor along a predefined area, either via an adjustable arm that can move along the x-axis, y-axis, along a rack or rail in the x-y plane, or in an eccentric pattern to provide vertical and horizontal or rotational adjustments. The movement along the axes may involve the entire sensor assembly along the side or flat surface of the earcup. Alternatively, or in combination, the movement may involve parts of the assembly, such as the sensor mount, along a track or adjustable surface. For embodiments having the sensor integrated within the cushion, the x-axis and y-axis adjustment is primarily accomplished by adjustment of the headset on the user's head to locate the sensor appropriately. Alternatively, different foam inserts may be provided each having different sensor placement within the cushion to customize the placement for a particular user.

The z-axis adjustment is limited in user interaction and can be provided by a spring, flexible arm, or foam pieces used individually or in combination to optimize skin contact, sensor readings, and comfort. The z-axis adjustments account for the ergonomics of the range of heads and the compressibility of the cushion to allow for a proper range of adjustments to be made to optimize skin contact, sensor readings, and comfort.

As demonstrated by the representative embodiments illustrated and describe in this disclosure, one or more advantages may be provided. For example, adjustable mounting of a biometric sensor within a circumaural headset may allow the user to adjust the position of the sensor relative to the headset to improve signal to noise ratio (SNR) and resulting accuracy and reliability of the sensor signal. The circumaural headset may provide isolation for the biometric sensor to reduce the effect of environmental factors, such as ambient noise and light, on the sensor signals. Resilient mounting of a biometric sensor may improve skin contact with the sensor during physical activity, while also improving comfort. Positioning of a biometric sensor in contact with the skin in front of the tragus over at least a portion of the TMJ provides a viable location for measurement of various biometric parameters, such as heartrate, oxygen saturation, blood flow, etc. In addition, positioning of the sensor forward of the tragus using a circumaural headset/headphone provides limited location variability from person to person. An adjustable biometric sensor mount according to various embodiments facilitates user adjustment and positioning of the sensor in two dimension for proper placement with a third-dimension adjustment for comfort and proper skin contact. Detection of jaw movement using a biometric sensor may be used to provide an automatic muting or gating function for a communication microphone associated with the headset, or to provide local or remote alerts based on inferred behavior associated with jaw position or movements.

While representative embodiments are described above, it is not intended that these embodiments describe all possible forms of the claimed subject matter. The words used in the specification are words of description rather than limitation, and it is understood that various changes may be made without departing from the spirit and scope of the disclosure.

Additionally, the features of various implementing embodiments may be combined to form further embodiments that may not be illustrated or described in combination. While the best mode has been described in detail, those familiar with the art will recognize various alternative designs and embodiments within the scope of the following claims. While various embodiments may have been described as providing advantages or being preferred over other embodiments with respect to one or more desired characteristics, those of ordinary skill in the art will recognize that one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. Any embodiments described as less desirable than other embodiments or prior art implementations with respect to one or more characteristics are not outside the scope of the disclosure and may be desirable for particular applications.

What is claimed is:

1. A headset comprising:
   a band;
   first and second circumaural earcup assemblies connected to the band; and
   at least one biometric sensor secured to an adjustable sensor mount, which is secured to at least one of the first and second circumaural earcup assemblies, the adjustable sensor mount configured to be movable in at least one direction to adjust a position of the biometric sensor relative to the at least one of the earcup assemblies to position the biometric sensor forward of a tragus of a user, wherein the adjustable sensor mount comprises:
   an arcuate rack mounted within an earcup of at least one of the first and second circumaural earcup assemblies; and
   a transverse rack engaging the arcuate rack and slidable relative thereto, wherein a base of the adjustable sensor mount engages the transverse rack and is slidable relative thereto.

2. The headset of claim 1 wherein the adjustable sensor mount comprises:
   a resilient device disposed within the base; and
   a cap having an eccentrically located aperture configured to receive the biometric sensor, the cap rotatably secured to the base over the resilient device and rotatable against a g force exerted by the resilient device to position the biometric sensor.

3. The headset of claim 2 wherein the support arm and the base are integrally molded with the earcup of one of the earcup assemblies.

4. A headset comprising:
   a band;
   first and second circumaural earcup assemblies connected to the band, each earcup assembly comprising an earcup and a cushion;
   an adjustable sensor mount secured to at least one of the earcups;
   a sensor secured to the adjustable sensor mount, wherein the adjustable sensor mount is movable along at least one axis to adjust a position of the sensor relative to the earcup;
   a speaker mounted in at least one of the earcups;
   a microphone; and a controller in communication with the sensor, the speaker, and the microphone, wherein the adjustable sensor mount comprises:

a support arm extending from an earcup of one of the earcup assemblies and supporting a base;

a spring disposed within the base; and a cap having an eccentrically located aperture configured to receive the sensor, the cap rotatably secured to the base over the spring and moveable against a spring force toward the base, wherein the support arm comprises an arcuate support arm having a slidable transverse support arm slidable relative thereto, and wherein the base is slidable along the transverse support arm.

* * * * *